United States Patent

Yu

[11] Patent Number: 5,903,672
[45] Date of Patent: May 11, 1999

[54] METHOD AND APPARATUS FOR CONVERSION OF ACCESS OF PREDICTION MACROBLOCK DATA FOR MOTION PICTURE

[75] Inventor: Pil-ho Yu, Suwon, Rep. of Korea

[73] Assignee: Samsung Electronics Co., Ltd., Kyungki-do, Rep. of Korea

[21] Appl. No.: 08/738,807

[22] Filed: Oct. 28, 1996

[30] Foreign Application Priority Data

Oct. 26, 1995 [KR] Rep. of Korea ......... 95-37394

[51] Int. Cl.⁶ ................................. G06K 9/36
[52] U.S. Cl. ............................ 382/236; 348/416
[58] Field of Search ................. 348/416, 402, 348/401, 400, 415, 409; 382/197, 233, 236, 245, 248, 250

[56] References Cited

U.S. PATENT DOCUMENTS 5,491,509  2/1996  Jeong et al. ............. 348/402

FOREIGN PATENT DOCUMENTS

| 0 424 026 A2 | 10/1990 | European Pat. Off. ....... H04N 7/137 |
| 0 542 195 A2 | 11/1992 | European Pat. Off. ........ H04N 9/00 |
| 0 675 654 A1 | 3/1995 | European Pat. Off. ........ H04N 7/50 |
| 0 710 028 A2 | 10/1995 | European Pat. Off. ........ H04N 7/24 |
| WO 95/04432 | 2/1995 | WIPO .............................. H04N 7/32 |

*Primary Examiner*—Joseph Mancuso
*Assistant Examiner*—Samir Ahmed
*Attorney, Agent, or Firm*—Sughrue, Mion, Zinn, Macpeak & Seas, PLLC

[57] ABSTRACT

An access conversion technique of prediction macroblock data which is used for decoding and encoding a motion picture is provided. The access conversion method and apparatus of prediction macroblock stores prediction macroblock data output from a frame memory in a separate storage unit, and then reads the stored prediction macroblock data in an order appropriate for processing the following prediction macroblock.

5 Claims, 11 Drawing Sheets

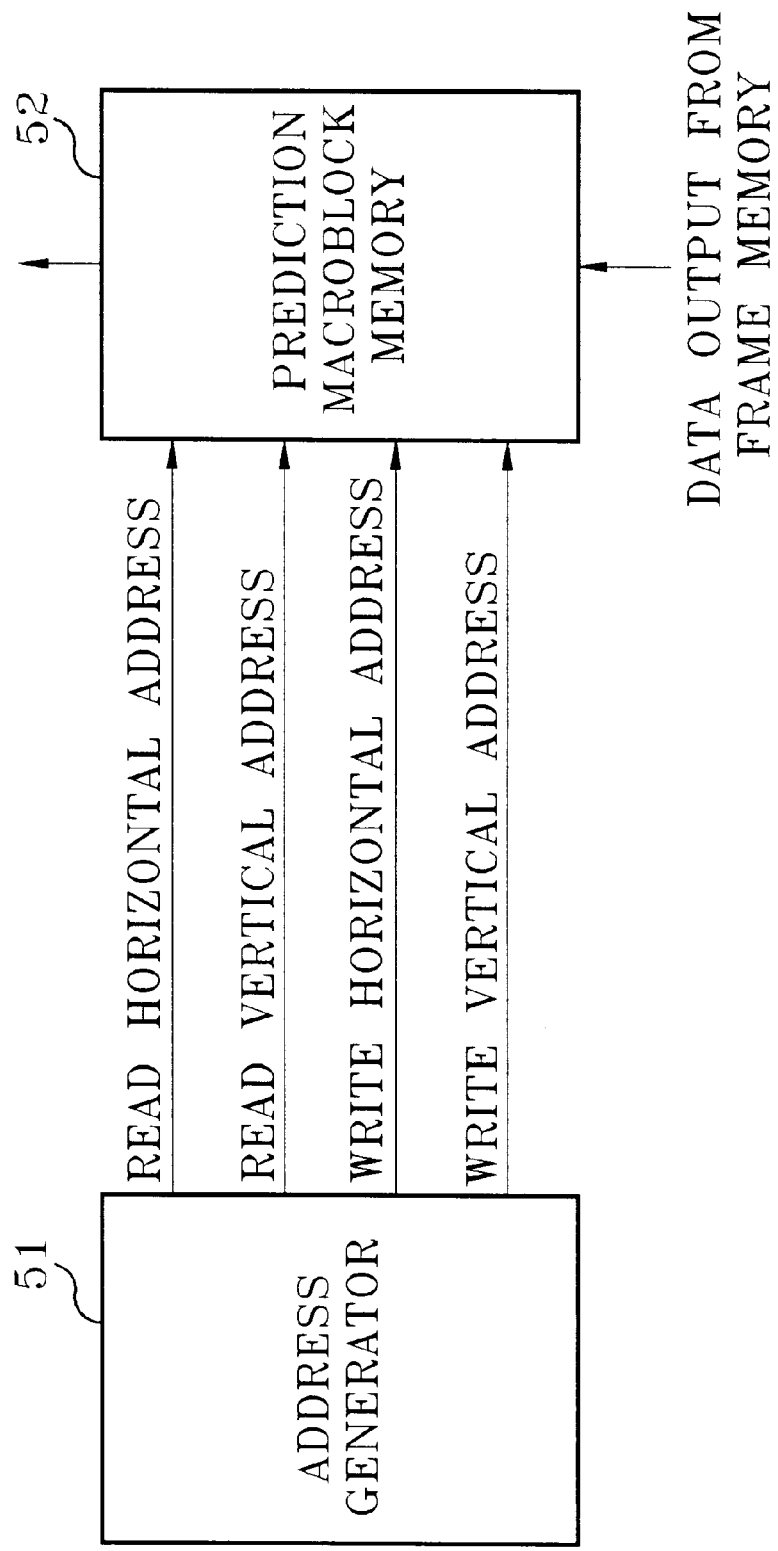

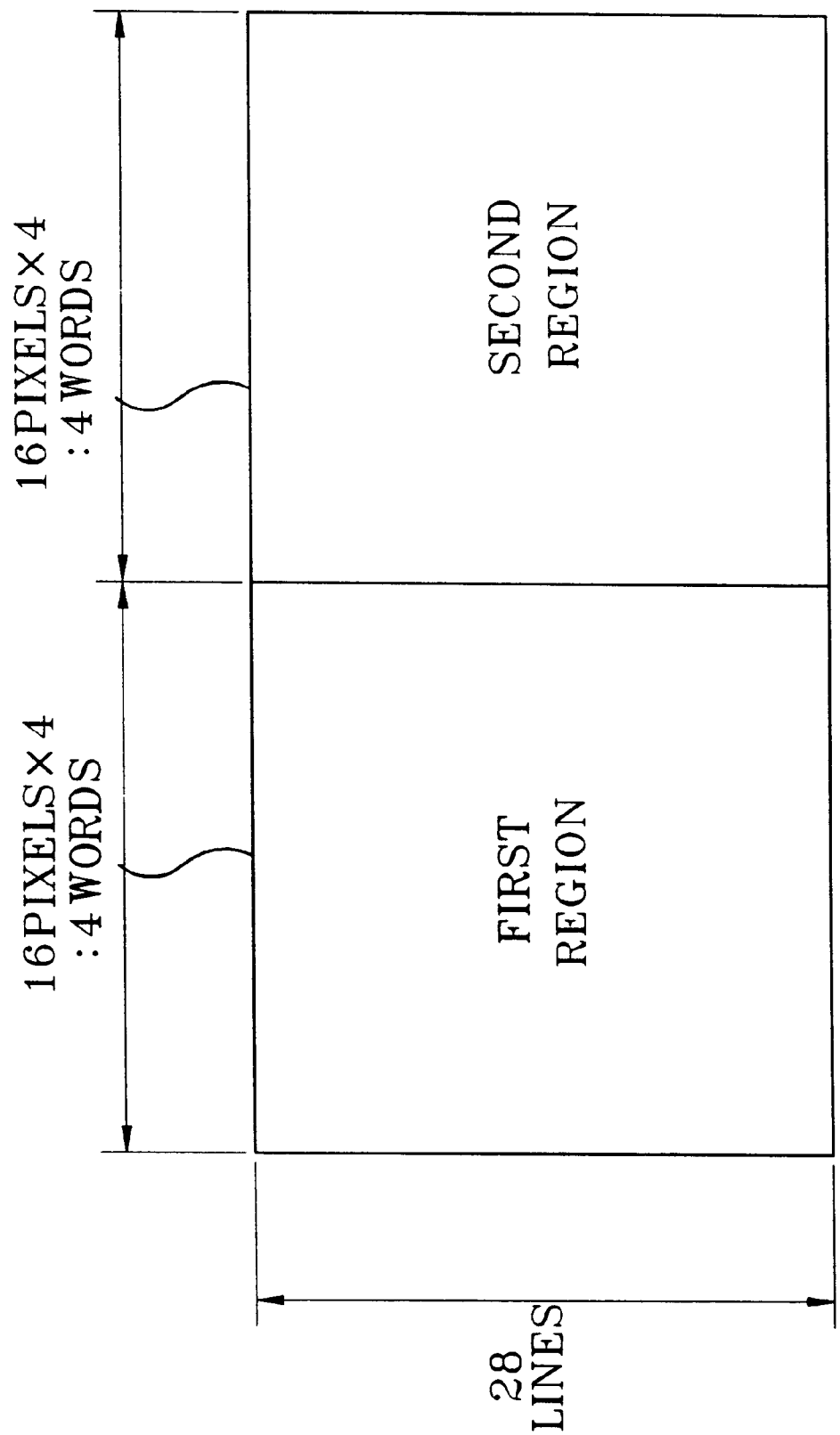


METHOD AND APPARATUS FOR CONVERSION OF ACCESS OF PREDICTION MACROBLOCK DATA FOR MOTION PICTURE

BACKGROUND OF THE INVENTION

The present invention relates to an access conversion technique of prediction macroblock data which is used for decoding and encoding a motion picture, and more particularly, to an access conversion method and apparatus of prediction macroblock data output from a frame memory which is stored in a separate storage unit, and then read by an order appropriate for processing the following prediction macroblock.

Motion picture coding is a technology of compressing and restoring motion picture data using motion compensation prediction, discrete cosine transformation (DCT), and variable length coding (VLC).

FIG. 1 is a block diagram of a general motion picture decoder. A variable length decoder 10 receives variable-length-coded data and decodes it via a reverse process. An inverse DCT portion 20 converts decoded data of a frequency region into video data of a spatial region. A motion compensator 30 reads a macroblock corresponding to a motion vector from video data of a previous frame stored in a frame memory 40 and adds the read macroblock to inversely discrete cosine transformed data, to thereby output motion picture data which is motion-compensated and restored.

Data compression of a motion picture is performed by DCT and VLC of a difference value between pictures. Considering movement of an inter-picture, a motion vector is found from a reference picture in units of a macroblock composed of Y of 16 pixels by 16 lines, U of 8 pixels by 8 lines and V of 8 pixels by 8 lines. Then, using a prediction macroblock of the position of the motion vector, a compression rate is enhanced, which is called a motion compensation prediction method.

In the motion compensation prediction method, prediction macroblock data is read from a frame memory, and the read prediction macroblock data is filtered via horizontal interpolation, vertical interpolation, forward prediction, and backward prediction.

However, since an order of reading prediction macroblock data from a frame memory does not match that of data which is used for a filtering process in a conventional motion picture decoding method, an access time of the prediction macroblock data is delayed.

SUMMARY OF THE INVENTION

To solve the above problem, it is an object of the present invention to provide an access conversion method and apparatus of prediction macroblock data for a motion picture in which the prediction macroblock data output from a frame memory is stored in a separate storage unit by an output order, and the stored prediction macroblock data is output from the storage unit in an order of use, in order to access the prediction macroblock data.

To accomplish the above object of the present invention, there is provided an access conversion method of prediction macroblock data which is stored in a frame memory and used for decoding and encoding a motion picture, the access conversion method comprising the steps of:

recording the prediction macroblock data output from the frame memory on a separate storage unit; and reading the recorded prediction macroblock data in an order appropriate for processing the following prediction macroblock from the separate storage unit.

There is also provided an access conversion apparatus of prediction macroblock data which is stored in a frame memory and used for decoding and encoding a motion picture, the access conversion apparatus comprising:

prediction macroblock access conversion means, coupled between the frame memory and a motion compensator for decoding and coding the motion picture, for recording the prediction macroblock data thereon and outputting the recorded prediction macroblock data in an order of use by the motion compensator.

BRIEF DESCRIPTION OF THE DRAWINGS

The preferred embodiments are described with reference to the drawings wherein:

FIG. 3 is a detailed block diagram of the prediction macroblock access converter shown in FIG. 2.

FIG. 6 shows a structure of a prediction macroblock memory according to one embodiment of the present invention.

DETAILED DESCRIPTION OF THE PREFERRED EMBODIMENT

A preferred embodiment of the present invention will be described below in more detail with reference to the accompanying drawings.

Figure 1:
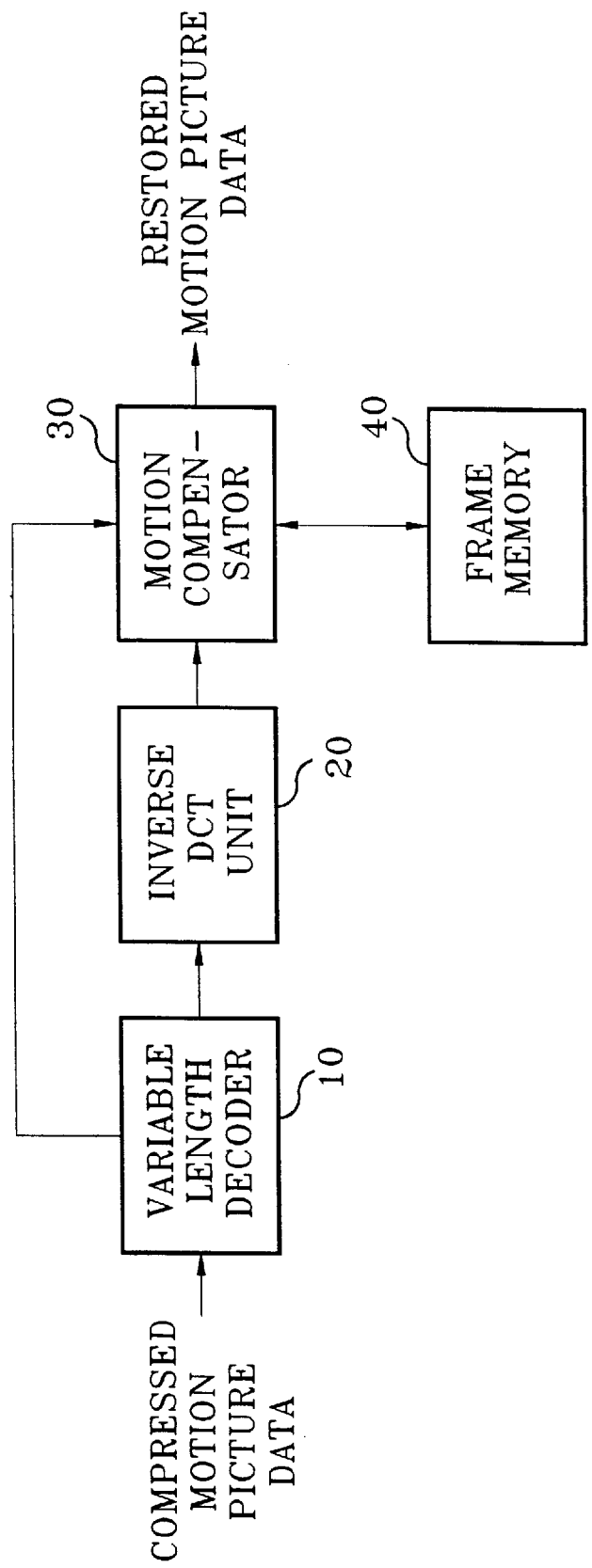
FIG. 1 is a block diagram of a general motion picture decoder.
Figure 2:
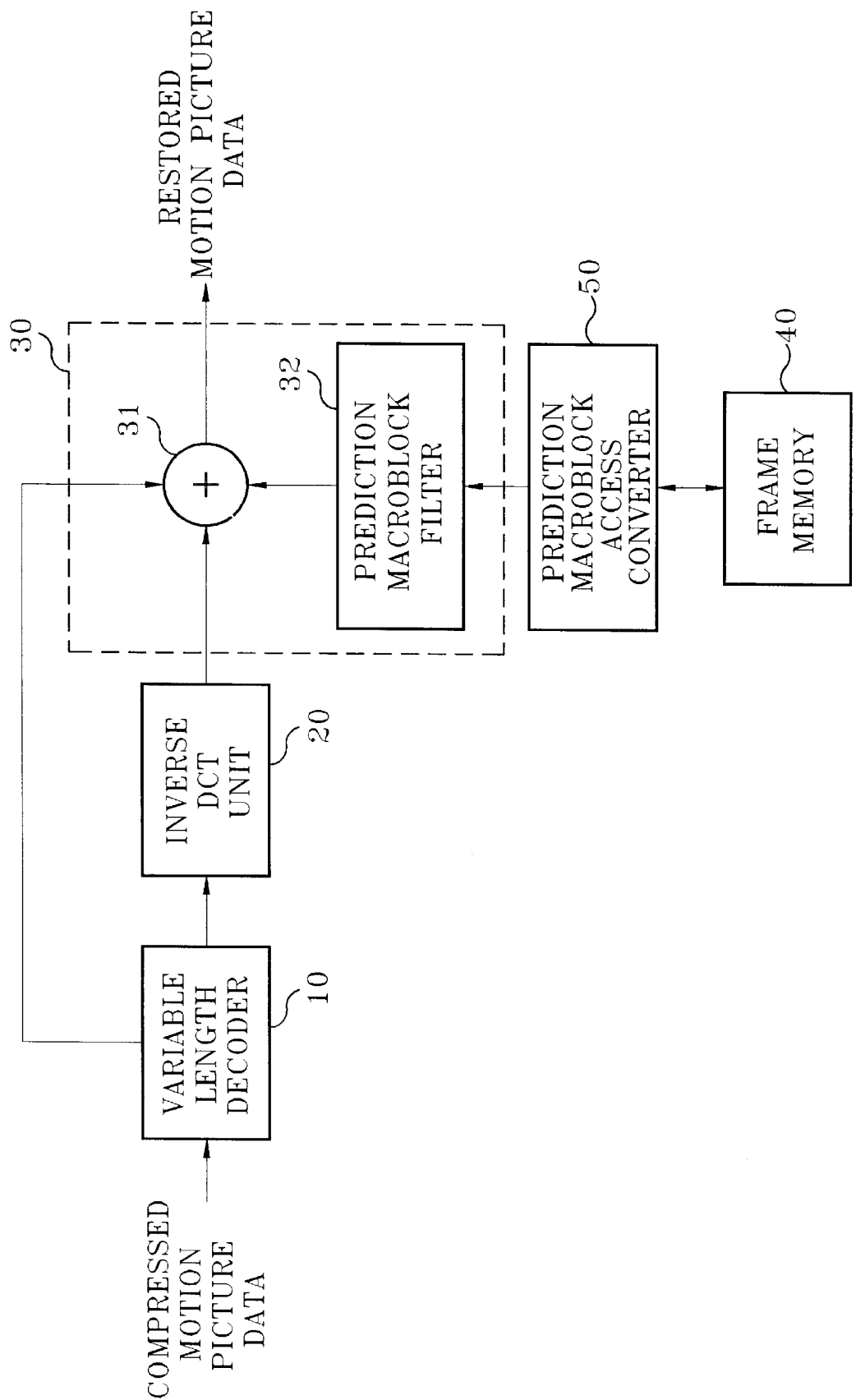
FIG. 2 is a block diagram of a motion picture decoder according to one embodiment of the present invention.

In FIG. 2 which shows a motion picture decoder according to a preferred embodiment of the present invention, a variable length decoder 10, an inverse DCT portion 20 and a frame memory 40 are same as those of FIG. 1.

For motion compensation, the preceding video data stored in the frame memory 40 is output as prediction macroblock data which is designated by a motion vector.

In the FIG. 2 embodiment, a prediction macroblock access converter 50 is disposed between the frame memory 40 and a motion compensator 30. The prediction macroblock access converter 50 stores the prediction macroblock data in an order in which it is output from the frame memory 40 and outputs it in an order by which it is used in a prediction macroblock filter 32 in the motion compensator 30. The prediction macroblock filter 32 performs filtering such as horizontal interpolation, vertical interpolation, forward prediction and backward prediction on the basis of the prediction macroblock data output from the prediction macroblock access converter 50. An adder 31 outputs restored motion image data on the basis of the motion vector output from the variable length decoder 10, the prediction macroblock data output from the prediction macroblock filter 32, and the data on which an inverse DCT operation has been performed.

FIG. 3 is a detailed block diagram of the prediction macroblock access converter shown in FIG. 2. The prediction macroblock access converter 50 includes an address generator 51 and a prediction macroblock memory 52. The address generator 51 generates a write horizontal address, a write vertical address, a read horizontal address and a read vertical address and applies these addresses, in order, to the prediction macroblock memory 52. The prediction macroblock memory 52 stores the prediction macroblock data output from the frame memory 40 according to the write horizontal address and the write vertical address input from the address generator 51, and outputs the stored prediction macroblock data according to the read horizontal address and the read vertical address input therefrom.

Hereinbelow, taking a motion compensation prediction method using a frame picture and a field picture as an example, a structure of the prediction macroblock memory 52 and the addresses generated from the address generator 51 will be specifically described when a data bus of the frame memory is 128 bits, that is, 16 pixels.

When motion encoding is performed in one frame units, the frame is called a frame picture, while when the former is performed in one field units, the field is called a field picture.

The motion compensation prediction method using the frame picture is classified into field prediction, frame prediction and dual-prime prediction. The motion compensation prediction method using the field picture is classified into field prediction, 16×8 MC prediction and dual-prime prediction. Among them, the frame prediction in the frame picture and both the field prediction and the dual-prime prediction in the field picture have a prediction unit having Y composed of 16 pixels by 16 lines, U composed of 8 pixels by 8 lines and V composed of 8 pixels by 8 lines, respectively. The field prediction in the frame picture and the dual-prime prediction and the 16×8 MC prediction in the field picture have a prediction unit having Y composed of 16 pixels by 8 lines, U composed of 8 pixels by 4 lines and V composed of 8 pixels by 4 lines, respectively. The former is called a "frame prediction group" and the latter is called a "field prediction group."

Figure 4C:
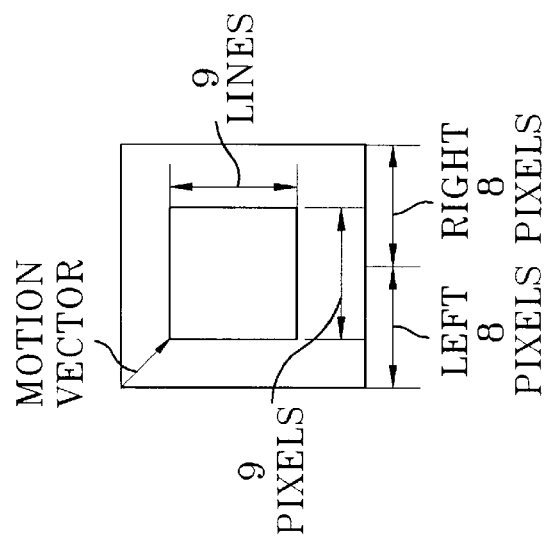
FIGS. 4A through 4C are conceptual diagrams of prediction macroblocks in a frame prediction group.
Figure 4B:
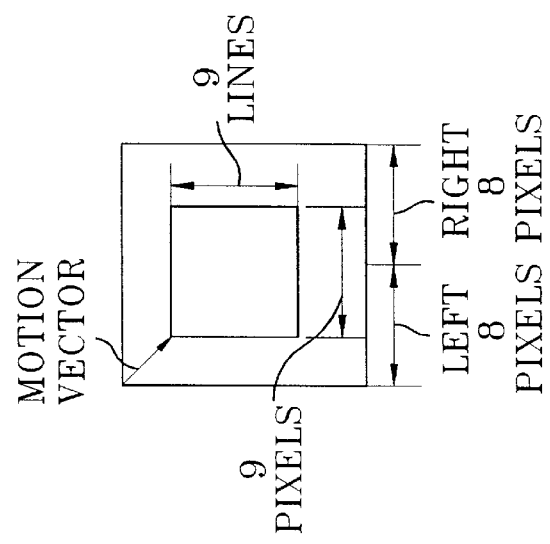
Figure 4A:
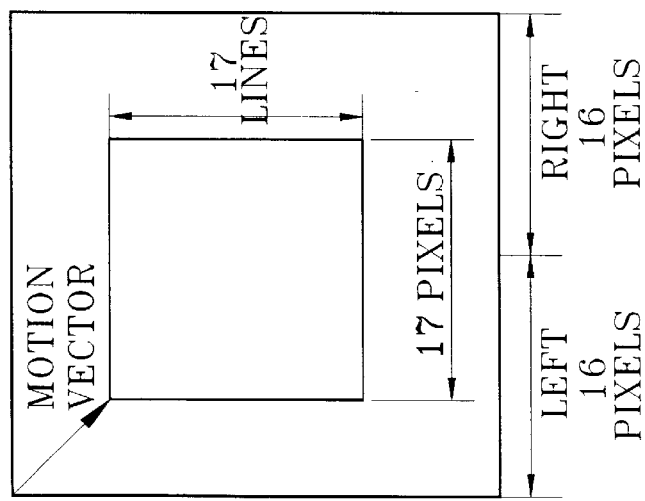

FIGS. 4A through 4C are conceptual diagrams of prediction macroblocks in a frame prediction group. FIG. 4A shows a Y-prediction macroblock in the frame prediction group. FIG. 4B shows a U-prediction macroblock in the frame prediction group. FIG. 4C shows a V-prediction macroblock in the frame prediction group. Since a motion vector has a half-pixel unit, the frame prediction group should read data having Y composed of 17 pixels by 17 lines, U composed of 9 pixels by 9 lines and V composed of 9 pixels by 9 lines, to perform half-pixel unit prediction.

Figure 5C:
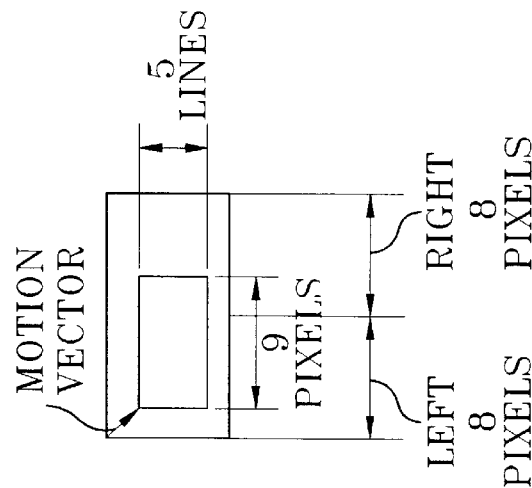
FIGS. 5A through 5C are conceptual diagram of prediction macroblocks in a field prediction group.
Figure 5B:
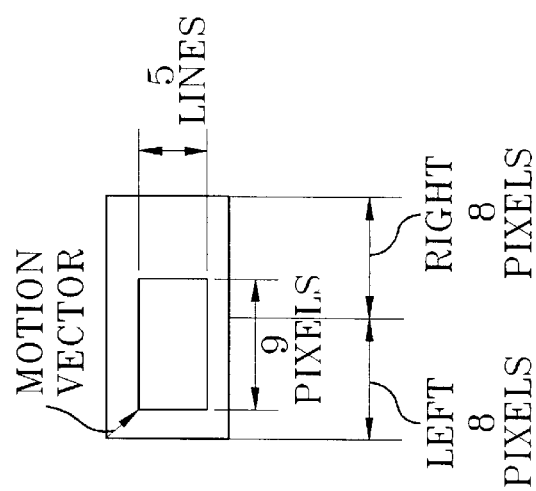
Figure 5A:
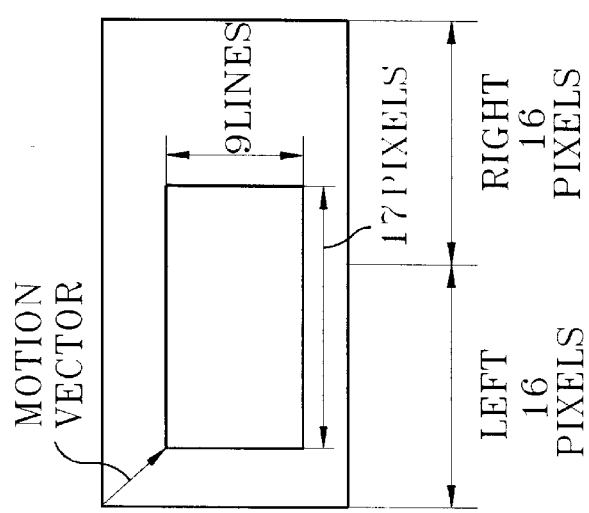

FIGS. 5A through 5C are conceptual diagrams of prediction macroblocks in a field prediction group. FIG. 5A shows a Y-prediction macroblock in the field prediction group. FIG. 5B shows a U-prediction macroblock in the field prediction group. FIG. 5C shows a V-prediction macroblock in the field prediction group. Since a motion vector has a half-pixel unit, the field prediction group should read data having Y composed of 17 pixels by 9 lines, U composed of 9 pixels by 5 lines and V composed of 9 pixels by 5 lines, to perform half-pixel unit prediction.

FIG. 6 shows a structure of a prediction macroblock memory according to one embodiment of the present invention. Referring to FIG. 6, the prediction macroblock memory used in the present invention is divided into a first region and a second region. Accordingly, receiving the data from the frame memory 40 and outputting the data from the prediction macroblock memory 52 can be simultaneously performed. First, data is written in the first region, and then the data stored in the first region is output while data is written into the second region. Then, data is written in the first region simultaneously with the output of the data stored in the second region.

Figure 7:
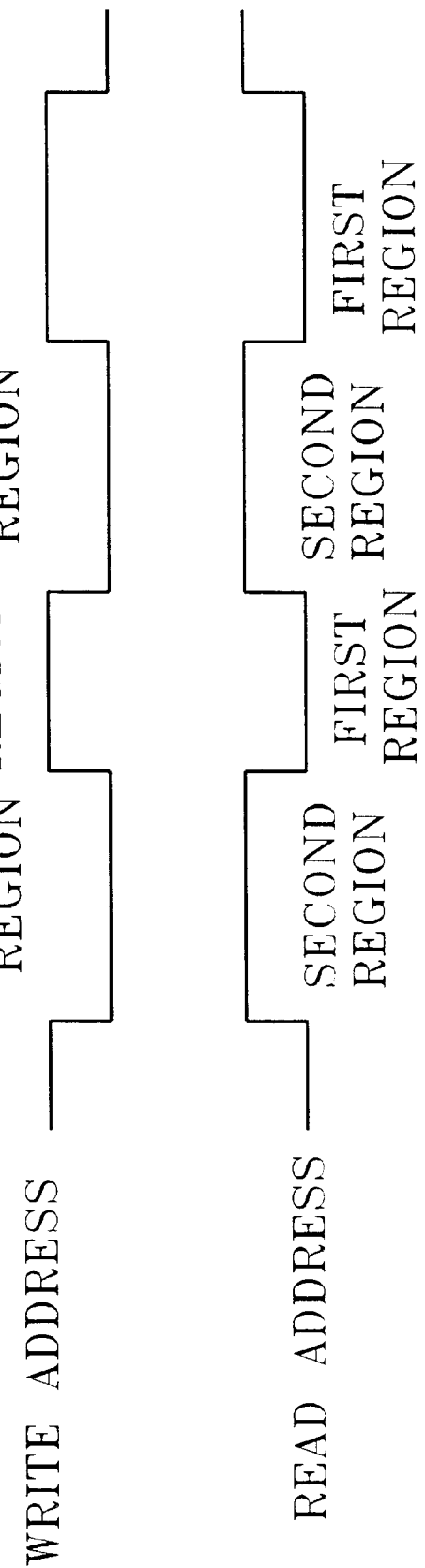
FIG. 7 is a timing diagram showing selection of a first region and a second region by a write address and a read address for accessing the prediction macroblock memory.

FIG. 7 is a timing diagram showing selection of a first region and a second region by a write address and a read address for accessing the prediction macroblock memory. As shown in FIG. 7, during writing data in the first region, the data stored in the second region is output, while during outputting the data stored in the first region, data is written in the second region.

Since the output from the frame memory is a 16-pixel unit, a horizontal address is assigned every 16-pixel unit in the horizontal direction of each region. Since 17-pixel data should be read from the frame memory in case of the Y-signal, two 16-pixel units are used to store one prediction macroblock. Considering processing of forward and backward prediction macroblock data, at least two prediction macroblocks should be stored in the horizontal direction. In FIG. 6, forward and backward prediction macroblocks of four words in the horizontal direction are stored. Also, in case of the frame prediction group, at least 26 lines composed of Y of 17 lines and U or V of 9 lines are stored. In case of the field prediction group, at least 14 lines composed of Y of 9 lines and U or V of 5 lines are stored. The present invention proposes a prediction macroblock memory of 28 lines in order to be adapted in both the frame prediction group and the field prediction group. Thus, the prediction macroblock memory according to the present invention has 28 lines in the vertical direction and a vertical address is assigned to each line, as shown in FIG. 6.

Now, a writing order by which the data out-put from the frame memory is written in the prediction macroblock memory having the structure shown in FIG. 6 and an output order by which the data is output from the prediction macroblock memory will be described.

Figure 8:
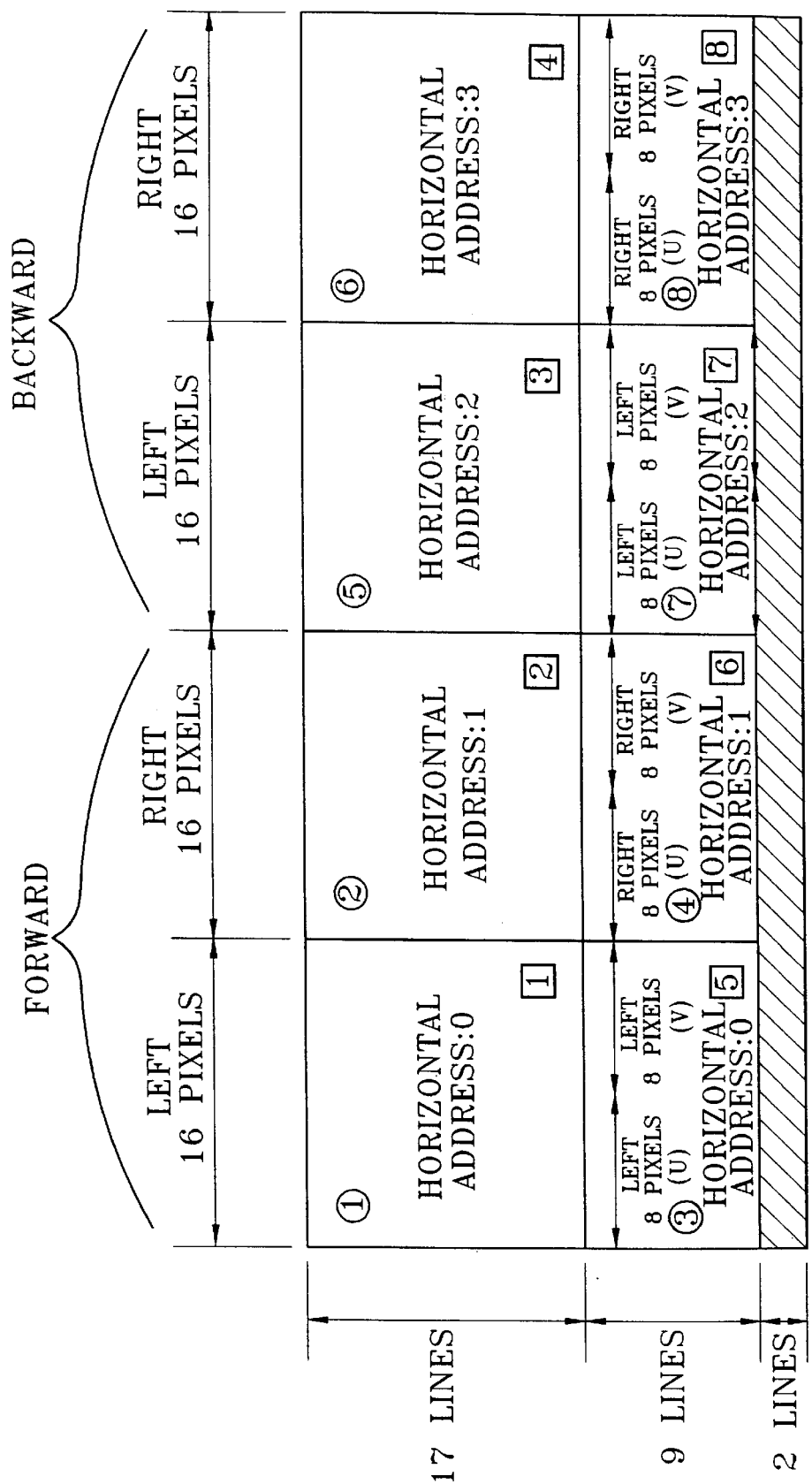
FIG. 8 is a view showing a state in which a frame prediction group is stored in one region of the prediction macroblock memory according to the present invention.

FIG. 8 is a view showing a state in which a frame prediction group is stored in one region of the prediction macroblock memory according to the present invention. As shown in FIG. 8, the left 16 pixels of the Y-signal are written in the section having a horizontal address of 0 and vertical addresses of 0–16, and the right 16 pixels of the Y-signal are written in the section having a horizontal address of 1 and vertical addresses of 0–16. Then, the left 8 pixels of the C-signal (U or V) are written in the section having a horizontal address of 0 and vertical addresses of 17–25, and the right 8 pixels of the C-signal (U or V) are written in the section having a horizontal address of 1 and vertical addresses of 17–25. As described above, forward prediction macroblocks are written in the sections having horizontal addresses of 0 and 1, while backward macroblocks are written in the sections having horizontal addresses of 2 and 3 by the above-described order. In FIG. 8, an order by which data is written in the prediction macroblock memory is expressed as ①②③④⑤⑥⑦⑧.

When data is read from the prediction macroblock memory, it is preferable for the following step that forward and backward macroblock data is read with respect to the Y-signal, and then the former is read with respect to the C-signal (U or V). Thus, in FIG. 8, an order by which data is read from the prediction macroblock memory is expressed as ①②③④⑤⑥⑦⑧.

Figure 9A:
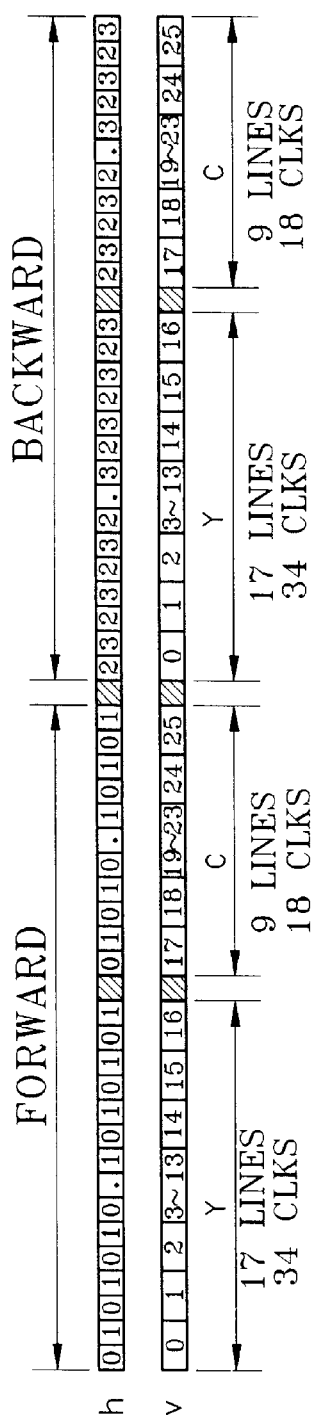
FIGS. 9A and 9B are views showing addresses generated from an address generator to write and read data in the order as shown in FIG. 8.
Figure 9B:
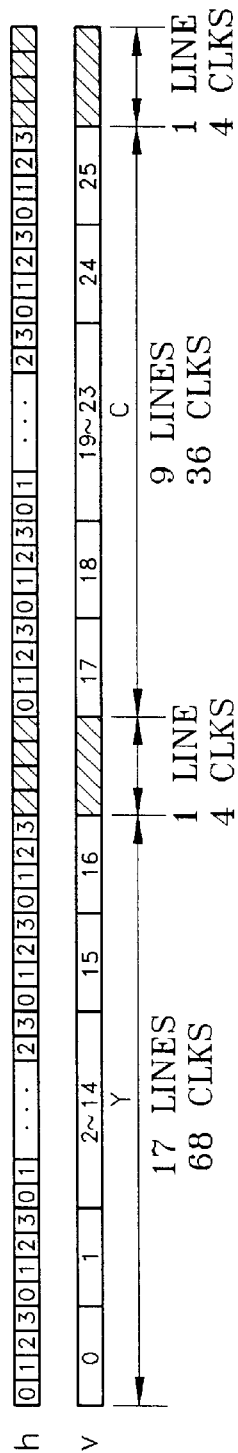

The addresses generated from the address generator in order to write and read data by the order shown in FIG. 8, are shown in FIGS. 9A and 9B FIG. 9A shows write addresses, and FIG. 9B shows read addresses. In more detail, horizontal addresses of 0 and 1 with respect to a vertical address of 0 represent the left 16 pixels and the right 16 pixels in the first line of the Y-signal in the forward prediction macroblock, respectively. As shown in FIG. 9A, the Y-signal and the C-signal of the forward prediction macroblock are written first and then the Y-signal and the C-signal of the backward macroblock are written. Referring to FIG. 9B, it can be seen that vertical address of 0 gains access to horizontal addresses of 0, 1, 2, and 3, which represents that the left and right 16 pixels of the Y-signal in the forward prediction macroblock recorded in the section having the vertical address of 0 and the horizontal addresses of 0 and 1 are read, and then the left and right 16 pixels of the Y-signal in the backward prediction macroblock recorded in the section having the vertical address of 0 and the horizontal addresses of 2 and 3 are read. Thus, the forward and backward macroblock data is read with respect to the Y-signal, and then the forward and backward macroblock data is read with respect to the C-signal (U or V).

Figure 10:
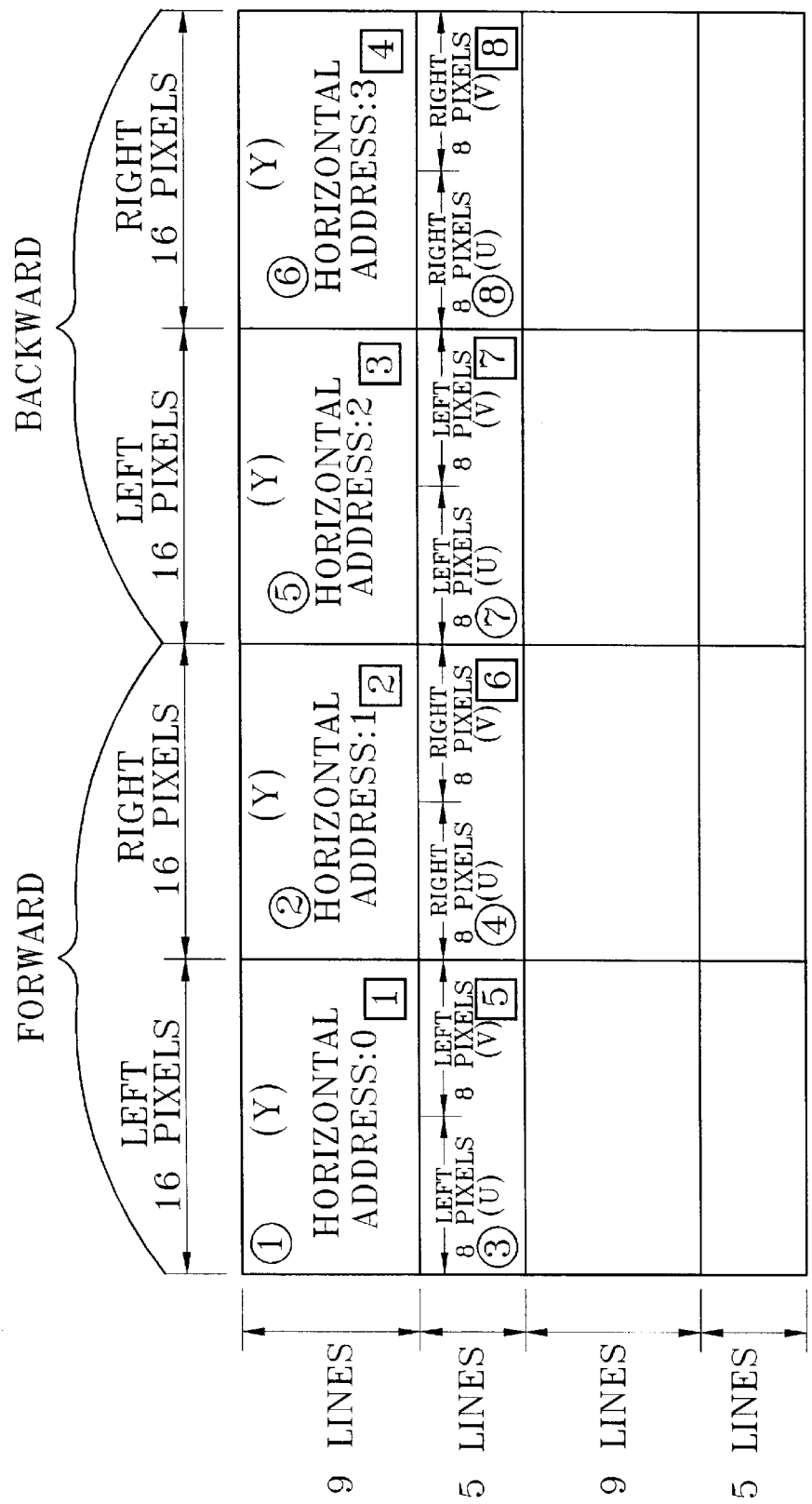
FIG. 10 is a view showing a state in which a field prediction group is stored in one region of the prediction macroblock memory according to the present invention.

FIG. 10 is a view showing a state in which a field prediction group is stored in one region of the prediction macroblock memory according to the present invention. As shown in FIG. 10, the left 16 pixels of the Y-signal are written in the section having the horizontal address of 0 and the vertical addresses of 0–8, and the right 16 pixels of the Y-signal are written in the section having the horizontal address of 1 and the vertical addresses of 0–8. Then, the left pixels of the C-signal (U or V) are written in the section having the horizontal address of 0 and the vertical addresses of 9–13, and the right 8 pixels of the C-signal (U or V) are written in the section having the horizontal address of 1 and the vertical addresses of 9–13. As described above, forward prediction macroblocks are written in the sections having horizontal addresses of 0 and 1, while backward prediction macroblocks are written in the sections having horizontal addresses of 2 and 3 by the abovedescribed order. In FIG. 10, an order by which data is written in the prediction macroblock memory is expressed as ①②③④⑤⑥⑦⑧.

When data is read from the prediction macroblock memory, it is preferable for the following step that forward and backward macroblock data is read with respect to the Y-signal, and then the former is read with respect to the C-signal (U or V). Thus, in FIG. 10 an order by which data is read from the prediction macroblock memory is expressed as ①②③④⑤⑥⑦⑧.

Figure 11A:
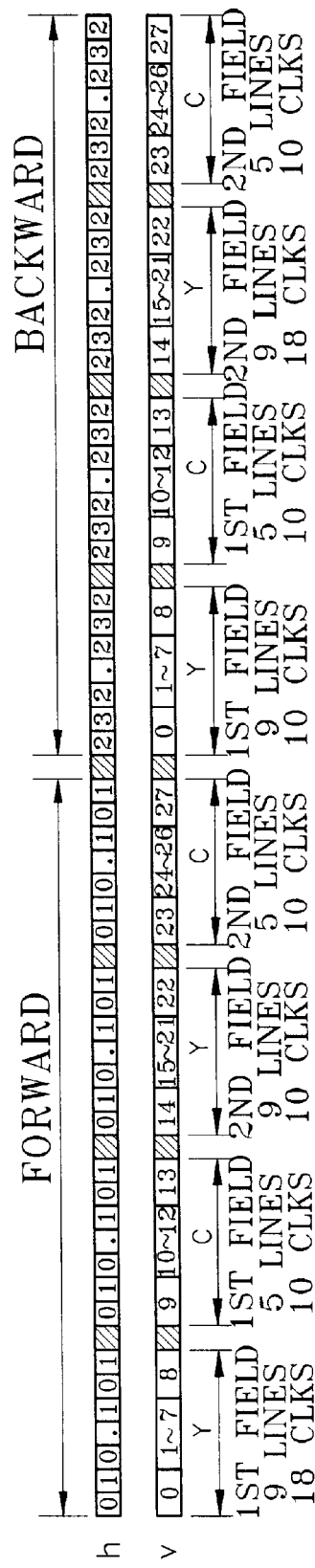
FIGS. 11A and 11B are views showing addresses generated from an address generator to write and read data in the order as shown in FIG. 10.
Figure 11B:
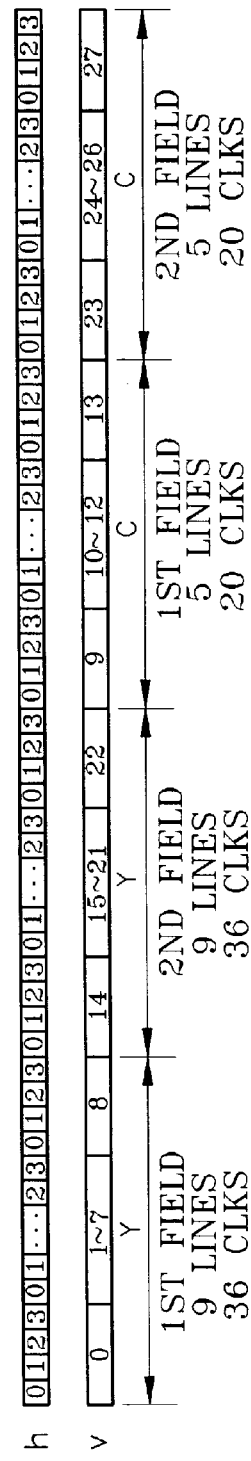

The addresses generated from the address generator in order to write and read data by an order shown in FIG. 10, are shown in FIGS. 11A and 11B. FIG. 11A shows write addresses, and FIG. 11B shows read addresses. In more detail, horizontal addresses of 0 and 1 with respect to a vertical address of 0 represent the left 16 pixels and the right 16 pixels in the first line of the Y-signal in the forward prediction macroblock, respectively. As shown in FIG. 11A, the Y-signal and the C-signal of the forward prediction macroblock are written first and then the Y-signal and the C-signal of the backward macroblock are written. Referring to FIG. 11B, it can be seen that the vertical address of 0 gains access to horizontal addresses of 0, 1, 2, and 3, which represents that the left and right 16 pixels of the Y-signal in the forward prediction macroblock recorded in the section having the vertical address of 0 and the horizontal addresses of 0 and 1 are read, and then the left and right 16 pixels of the Y-signal in the backward prediction macroblock recorded in the section having the vertical address of 0 and the horizontal addresses of 2 and 3 are read. Thus, the forward and backward macroblock data is read with respect to the Y-signal, and then the forward and backward macroblock data is read with respect to the C-signal (U or V).

The above embodiment of the present invention has been described with respect to the case that the prediction macroblock data access conversion method and apparatus is used for motion compensation decoding. The prediction macroblock data access conversion method and apparatus can be used in motion compensation prediction for motion image coding.

As described above, the prediction macroblock data access conversion method and apparatus according to the present invention stores a motion picture output from a frame memory in a separate storage unit, and then reads the stored prediction macroblock data in an order appropriate for processing the following prediction macroblock. Thus, the time for accessing the prediction macroblock data can be reduced.

While only certain embodiments of the invention have been specifically described herein, it will be apparent that numerous modifications may be made thereto without departing from the spirit and scope of the invention.

What is claimed is:

1. An access conversion method of prediction macroblock data which is stored in a frame memory and used for decoding and encoding a motion picture, the access conversion method comprising the steps of:

storing, according to a first order, first prediction macroblock data output from said frame memory into a first region of a memory unit;

storing, according to the first order, second prediction macroblock output from said frame memory into a second region of said memory unit;

reading said first prediction macroblock data stored in said first region of said memory unit according to a second order appropriate for processing the first prediction macroblock data by a motion compensator; and reading said second prediction macroblock data stored in said second region of said memory unit according to said second order;

wherein said first order and said second order are different; and wherein, when said storing into said first; region of said memory unit is being performed, said reading of said second prediction macroblock data stored in said first second region of said memory unit is performed simultaneously, and when said storing into said second region of said memory unit is being performed, said reading of said first prediction macroblock data stored in said first region of said memory unit is performed simultaneously.

2. The access conversion method according to claim 1, wherein in each of said storing steps, a forward Y-signal and a forward C-signal are stored and then a backward Y-signal and a backward C-signal are stored in turn in an order by which the prediction macroblock data is output from said frame memory.

3. The prediction macroblock data access conversion method according to claim 2, wherein in said prediction macroblock data reading step, a forward Y-signal and a backward Y-signal are read and then a forward C-signal and a backward C-signal are read in turn in an order by which the prediction macroblock data is used in motion compensation.

4. An access conversion apparatus of prediction macroblock data which is stored in a frame memory and used for decoding and encoding a motion picture, the access conversion apparatus comprising:

a prediction macroblock converter, coupled between the frame memory and a motion compensator;

said prediction macroblock converter comprising:

a prediction macroblock memory that is divided into a first region and a second region;

means for writing, according to a first order, into said first region first prediction macroblock data received from said frame memory and for writing, according to the first order, into said second region second prediction macroblock data received from said frame memory; and means for reading, according to a second order different from the first order and appropriate for processing said first prediction macroblock data by said motion compensator, the first prediction macroblock data from said first region and the second prediction macroblock data from said second region;

wherein when said means for writing writes into said first region, said means for reading simultaneously reads from said second region, and when said means for writing writes into said second region, said means for reading simultaneously reads from said first region.

5. The prediction macroblock data access conversion apparatus according to claim 4, wherein said prediction macroblock access conversion means further comprises:

an address generator for generating a write horizontal address and a write vertical address for writing, in said first order, said prediction macroblock data output from said frame memory in either said first region or said second region of said prediction macroblock memory, and generating a read horizontal address and a read vertical address for outputting said prediction macroblock data in said second order appropriate for processing said prediction macroblock data by said motion compensator;

wherein said prediction macroblock memory accesses said prediction macroblock data by said write horizontal address, said write vertical address, said read horizontal address and said read vertical address which are generated by said address generator.

\* \* \* \* \*